United States Patent
Nordström et al.

(10) Patent No.: US 10,721,790 B2
(45) Date of Patent: Jul. 21, 2020

(54) METHODS AND NODES FOR MAINTAINING A WIRELESS CONNECTION IN A WIRELESS COMMUNICATIONS NETWORK

(71) Applicant: Telefonaktiebolaget L M Ericsson (publ), Stockholm (SE)

(72) Inventors: Eric Nordström, Stockholm (SE); Paul Schliwa-Bertling, Ljungsbro (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 727 days.

(21) Appl. No.: 13/997,313

(22) PCT Filed: Apr. 16, 2013

(86) PCT No.: PCT/SE2013/050413
§ 371 (c)(1),
(2) Date: Jun. 24, 2013

(87) PCT Pub. No.: WO2013/158023
PCT Pub. Date: Oct. 24, 2013

(65) Prior Publication Data
US 2014/0064202 A1    Mar. 6, 2014

Related U.S. Application Data

(60) Provisional application No. 61/625,117, filed on Apr. 17, 2012.

(51) Int. Cl.
*H04W 76/04* (2009.01)
*H04W 76/25* (2018.01)
*H04L 5/00* (2006.01)

(52) U.S. Cl.
CPC ............ *H04W 76/25* (2018.02); *H04L 5/001* (2013.01)

(58) Field of Classification Search
CPC ...... H04W 76/045; H04W 76/25; H04L 5/001
(Continued)

(56) References Cited

U.S. PATENT DOCUMENTS

2006/0280198 A1* 12/2006 Lee ................... H04B 1/7085
370/445
2007/0070908 A1   3/2007 Ghosh et al.
(Continued)

FOREIGN PATENT DOCUMENTS

CN          102124656 A      7/2011
WO     WO 2008/130300 A1   10/2008
(Continued)

OTHER PUBLICATIONS

International Application No. PCT/EP2013/051804 filed Jan. 30, 2013.
(Continued)

*Primary Examiner* — Charles C Jiang
*Assistant Examiner* — Voster Preval
(74) *Attorney, Agent, or Firm* — Sage Patent Group

(57) ABSTRACT

A method and user node for maintaining a connection with a network node when operating in a multi-carrier mode using a first filter configuration to receive multiple frequency carriers simultaneously for downlink communication. The user node applies a mode switching scheme comprising first intervals for the multi-carrier mode and second intervals for a single carrier mode using a second filter configuration to receive a single carrier for the downlink communication. In this case, the user node switches temporarily from the multi-carrier mode to operate in the single carrier mode during the second intervals according to the mode switching scheme. Thereby the user node is enabled to maintain the connection by receiving messages and/or control signalling from the network node over the single frequency carrier
(Continued)

during the second intervals, for example when the multi-carrier mode is highly disturbed by interference.

19 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2009/0232061 A1* | 9/2009 | Rajamani | H04B 7/0697 370/329 |
| 2009/0279588 A1* | 11/2009 | Mochizuki | H04B 1/713 375/137 |
| 2010/0091743 A1* | 4/2010 | Kazmi | H04B 7/0417 370/336 |
| 2011/0019715 A1* | 1/2011 | Brisebois | H04B 7/0626 375/130 |
| 2011/0091715 A1* | 4/2011 | Rakutt | B32B 3/18 428/317.1 |
| 2011/0142147 A1* | 6/2011 | Chen | H04B 7/0417 375/260 |
| 2011/0176498 A1* | 7/2011 | Montojo | H04W 72/048 370/329 |
| 2012/0021688 A1* | 1/2012 | Bhattad | H04B 7/0452 455/63.1 |
| 2012/0082137 A1* | 4/2012 | Ito | H04L 27/2647 370/331 |

FOREIGN PATENT DOCUMENTS

| | | |
|---|---|---|
| WO | WO 2009/138385 A1 | 11/2009 |
| WO | WO2009/138385 A1 | 11/2009 |
| WO | WO 2009138385 A1 * | 11/2009 |
| WO | WO2010/005775 A1 | 1/2010 |
| WO | WO 2010/129223 A2 | 11/2010 |
| WO | WO 2010129223 A2 * | 11/2010 |
| WO | WO 2012/134376 A2 | 10/2012 |

OTHER PUBLICATIONS

3GPP TS 45.002 V11.2.0 (Mar. 2013) Technical Specification, Technical Specification Group GSM/EDGE Radio Access Network; Multiplexing and multiple access on the radio path (Release 11), Global System for Mobile Communications, 133 pages.

3GPP TR 45.912 V11.0.0 (Sep. 2012) Technical Report, Technical Specification Group GSM/EDGE Radio Access Network; Feasibility study for evolved GSM/EDGE Radio Access Network (GERAN) (Release 11), Global System for Mobile Communications, 519 pages.

International Search Report and Written Opinion Corresponding to International Application No. PCT/SE2013/050413; dated Jul. 15, 2013; 12 Pages.

Zhu X. et al. "Interference Analysis for User Equipment in LTE-Advanced System with Carrier Aggregation", *2012 2$^{nd}$ International Conference on Computer Science and Network Technology*, Dec. 2012, 1028-1032.

Japanese Office Action with Summary of Reason for Refusal (in English) in corresponding Japanese Patent Application No. 2015-506940; dated Feb. 9, 2017; Japanese Office Action 3 Pages; Summary of Reasons for Refusal 1 Page.

Chinese Office Action with Search Report and corresponding Translation in corresponding Chinese Patent Application No. 2013800202948; dated Sep. 18, 2016; Chinese Office Action 2 Pages; Translation 8 Pages.

* cited by examiner

| User | SC_MFRM | STRT_BLK | NR_SC_BLKS |
|---|---|---|---|
| 1 | 0 | 0 | 1 |
| 2 | 0 | 1 | 1 |
| 3 | 0 | 2 | 2 |
| 4 | 0 | 4 | 1 |
| 5 | 0 | 5 | 1 |
| 6 | 0 | 6 | 2 |
| 7 | 1 | 0 | 1 |
| 8 | 1 | 1 | 1 |
| 9 | 1 | 2 | 2 |
| 10 | 1 | 4 | 1 |
| 11 | 1 | 5 | 2 |
| 12 | 1 | 9 | 1 |

METHODS AND NODES FOR MAINTAINING A WIRELESS CONNECTION IN A WIRELESS COMMUNICATIONS NETWORK

CROSS-REFERENCE TO RELATED APPLICATION

This application is a 35 U.S.C. § 371 national stage application of PCT International Application No. PCT/SE2013/050413, filed in English on 16 Apr. 2013, which claims priority to U.S. Provisional Application No. 61/625,117 filed on 17 Apr. 2012. The disclosures of the above referenced applications are hereby incorporated herein in their entireties by reference.

TECHNICAL FIELD

The present disclosure relates generally to a user node, a network node and methods therein, for maintaining a wireless connection for the user node with the network node in a network for wireless communication when using multiple carriers.

BACKGROUND

In traditional networks for wireless communication, such as GSM networks, a single narrowband frequency carrier is typically used for transferring data and messages in signals between the network and a user node connected to a node of the network, typically called network node or base station, either for transmitting signals from the network node on a downlink connection to the user node or for transmitting signals from the user node on an uplink connection to the network node. Recently, increasingly advanced user terminals and devices have emerged on the market, e.g. smartphones, tablets and wireless laptops, which are suitable for services such as internet browsing and streaming of media both generating more traffic on the downlink than on the uplink. The demands for high data throughput on the downlink has therefore increased. In this description, the term "user node" is used to represent any communication equipment capable of receiving downlink radio signals from a sending network node of a wireless communications network. The user node in this context could also be referred to as a mobile terminal, mobile station, User Equipment (UE), device, etc., depending on the terminology used.

To meet the greater demand for data throughput on the downlink, the possibility of using two or more carriers in parallel on the downlink to a user node has been introduced such that the amount of data that can be communicated to the user node is basically multiplied by the number of carriers used. For example, the concept of Downlink Dual Carrier, DLDC, was specified in 3GPP GERAN, Release 7, as an enhancement to increase data throughput. The DLDC feature thus introduces two parallel carriers transmitted on two different frequencies on the downlink to the same user node, provided that the user node is capable of handling two individual receiver paths or chains for the two carriers. It may also be possible to use more carriers than two, e.g. four carriers or even more to expand the above DLDC feature. The use of multiple downlink carriers would be dependent on capabilities of the user node and it puts requirements on the user node's receiver as follows.

Since the carriers are transmitted on separate frequencies in a multi-carrier scenario for the downlink, it is necessary to use a receiver filter in the user node that encompasses all frequencies used, i.e. having a nominal bandwidth of a range from the lowest carrier frequency to the highest one used, and the receiver filter therefore typically needs to be configured with considerably wider nominal bandwidth than the filter bandwidth needed for single carrier reception. This is schematically illustrated in FIG. 1 where the filter bandwidth 102 required for reception of four carriers in parallel is much wider than the filter bandwidth 100 needed for reception of just a single carrier. As a result, a receiver with wide filter will be more sensitive to interference caused by other transmissions within the range of the wide filter bandwidth 102. Alternatively, a separate filter could be used for each individual carrier, e.g. four times the filter bandwidth 100 in the FIG. 1 example, which would more or less omit the frequencies lying between the carriers used. However, this solution would require a separate receiver equipment, also referred to as "RF front end", for each carrier resulting in intolerable costs and space requirements for the user node.

In addition, a wide filter will let through a wider range of frequencies that lie outside its nominal filter bandwidth, as compared to a more narrow filter which is able to suppress such outside frequencies much more efficiently due to the inherent filter characteristics. This is illustrated by diagrams in FIGS. 2a and 2b showing the magnitude of passed signals over frequency through a narrow filter and through a wide filter, respectively. In these examples, it is assumed that a suppression of −60 dB is sufficient to protect the receiver from harmful interference signals. FIG. 2a illustrates the characteristics 200 of a narrow filter with a nominal bandwidth denoted NB. This filter suppresses frequencies outside its nominal bandwidth quite fast such that the range "x" of potentially harmful interference outside the nominal bandwidth NB is relatively small. In contrast, FIG. 2b illustrates the characteristics 202 of a wide filter with a nominal bandwidth denoted WB. This filter suppresses frequencies outside its nominal bandwidth considerably less such that the range "y" of potentially harmful interference outside the nominal bandwidth WB is much larger than range x.

It can thus be understood that using a wide filter for multi-carrier reception as of FIG. 2b will make the receiver far more sensitive to interference than when using a narrow filter for single carrier reception, for mainly two reasons. Firstly, the nominal bandwidth of the wide filter, indicated as the dotted area in FIG. 2b, with no suppression on neither the used carrier frequencies nor intermediate frequencies, is much wider compared to the nominal bandwidth of the narrow filter, indicated as the striped area in FIG. 2a. Secondly, it is evident from FIGS. 2a and 2b that the frequency range outside the nominal filter bandwidth where the receiver can be subjected to harmful interference, indicated as x and y respectively, is greatly increased when a wideband filter is used compared to using a narrowband filter, e.g. having a similar filter complexity. Such harmful interference may result in reduced quality and/or throughput of the downlink communication due to incorrect or failed detection and decoding of received signals.

When a wider filter is used by the user node's receiver in multi-carrier mode, the interference protection is thus greatly reduced in the receiver. In a situation with high interference from other transmissions, the receiver will have reduced sensitivity to received signals such that there is a risk of failed reception of downlink signals. In very harsh conditions the receiver may even be virtually "blocked", i.e. it is unable to decode any downlink signals at all on the carriers used due to the interfering signals let through by the filter. In such a blocking scenario, the receiver is more or less "blind" to data reception and the additional carriers provided by multi-carrier mode will not increase the throughput compared to the single carrier mode. Consequently, the receiver will also be blind to messages and control signaling from the network that may be important for maintaining the connection and other things. Examples of such messages and control signaling include various instructions to the user node e.g. relating to power regulation, acknowledgement or non-acknowledgement of received and decoded data, request for measurement reporting, uplink scheduling, change of carriers, frequency hopping schemes, switch from multi-carrier mode to single carrier mode, and so forth.

For example, if a connection with a user node is suddenly subjected to severe downlink interference when in multi-carrier mode, the network may not be able to get across important commands to the user node for overcoming the interference, such as an instruction to switch to single carrier mode for more robust reception by using a narrow filter. As a result, the connection may be lost altogether without any possibility for remedy. Another important message to get across to the user node relates to paging of the user node for an incoming speech call or other session, which may not succeed due to interference when in multi-carrier mode such that the call is missed.

SUMMARY

It is an object of embodiments described herein to address at least some of the problems and issues outlined above. It is possible to achieve this object and others by using a user node, a network node and methods therein as defined in the attached independent claims.

According to one aspect, a method is performed by a user node for maintaining a connection with a network node of a wireless communications network when the user node operates in a multi-carrier mode using a first filter configuration to receive multiple frequency carriers simultaneously for downlink communication. In this method, the user node applies a mode switching scheme which comprises first intervals for the multi-carrier mode and second intervals for a single carrier mode. In the single carrier mode, the user node uses a second filter configuration to receive a single carrier for the downlink communication.

According to the mode switching scheme, the user node switches temporarily from the multi-carrier mode to operate in the single carrier mode during the second intervals. Thereby, the user node is enabled to maintain the connection by receiving messages and/or control signalling from the network node over the single frequency carrier during the second intervals.

By switching to the single carrier mode during the second intervals in this manner, the user node will be less susceptible to interference when operating in the single carrier mode mainly due to the more narrow filter used as compared to operating in the multi-carrier mode. It is thus an advantage that the user node is able to receive messages and/or control signaling from the network node more safely over the single frequency carrier during the second intervals in case there is interference disturbing reception in the multi-carrier mode, which may be important or even crucial for maintaining the connection. The single carrier mode may e.g. be used to get across a paging message for an incoming call or important instructions from the network node to the user node.

According to another aspect, a user node is configured to maintain a connection with a network node of a wireless communications network when operating in a multi-carrier mode using a first filter configuration to receive multiple frequency carriers simultaneously for downlink communication. The user node comprises a logic unit adapted to apply a mode switching scheme comprising first intervals for the multi-carrier mode and second intervals for a single carrier mode using a second filter configuration to receive a single carrier for the downlink communication.

The user node also comprises a mode switching unit adapted to switch temporarily from the multi-carrier mode to operate in the single carrier mode during the second intervals according to the mode switching scheme. Thereby, the user node will be enabled to maintain the connection by receiving messages and/or control signalling from the network node over the single frequency carrier during the second intervals.

According to another aspect, a method is performed by a network node of a wireless communications network, for maintaining a connection with a user node when operating in a multi-carrier mode of sending multiple frequency carriers simultaneously for downlink communication. In this latter method, the network node applies a mode switching scheme comprising first intervals for the multi-carrier mode and second intervals for a single carrier mode of sending a single carrier for the downlink communication.

The network node further instructs the user node to switch temporarily from the multi-carrier mode to operate in the single carrier mode during the second intervals according to the mode switching scheme, thereby enabling the user node to maintain the connection by receiving messages and/or control signalling from the network node over the single frequency carrier during the second intervals.

According to another aspect, a network node of a wireless communications network is configured to maintain a connection with a user node when operating in a multi-carrier mode of sending multiple frequency carriers simultaneously for downlink communication. The network node comprises a logic unit adapted to apply a mode switching scheme comprising first intervals for the multi-carrier mode and second intervals for a single carrier mode of sending a single carrier for the downlink communication.

The network node further comprises an instructing unit adapted to instruct the user node to switch temporarily from the multi-carrier mode to operate in the single carrier mode during the second intervals according to the mode switching scheme. Thereby the user node will be enabled to maintain the connection by receiving messages and/or control signalling from the network node over the single frequency carrier during the second intervals.

The above methods and nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which can be used to maintain a connection of a user node with a network node of a wireless communications network, when the user node operates in a multi-carrier mode using a first filter configuration for its receiver to receive multiple carriers simultaneously for downlink communication. This solution is particularly useful in case harmful interference occurs at frequencies within or adjacent to the frequency bandwidth used in the multi-carrier mode which interference could reduce quality and/or throughput of the communication or even cause a dropped or missed connection, as said above. As also explained above, the user node is typically more susceptible to interference when operating in multi-carrier mode than when operating in single carrier mode mainly due to the wider filter used.

Figure 1:
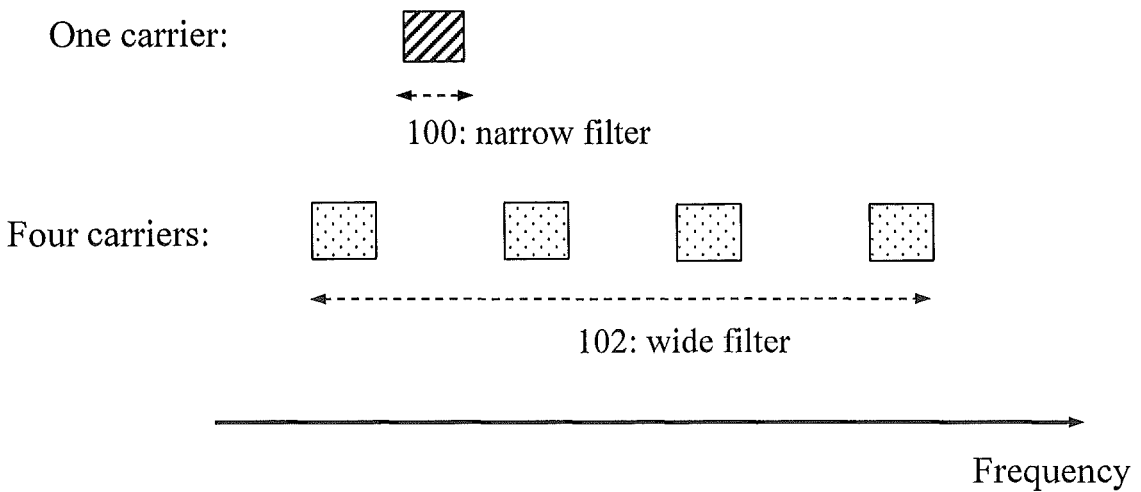
FIG. 1 is a diagram illustrating filter configurations when using one carrier and when using four carriers, according to the prior art.
Figure 2A:
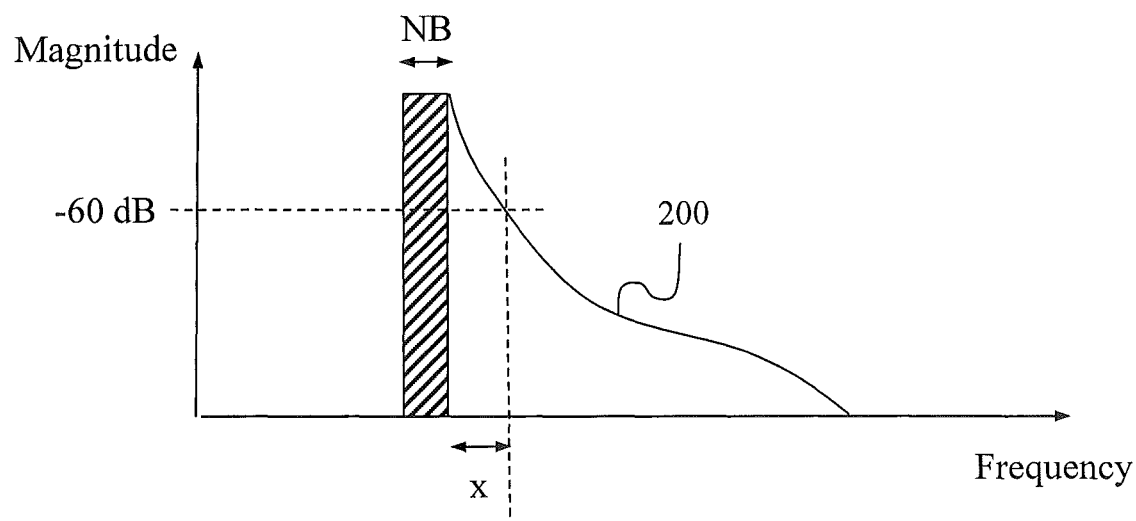
FIGS. 2a and b are diagrams illustrating how signals are suppressed by a narrow filter and by a wide filter, respectively, according to the prior art.
Figure 2B:
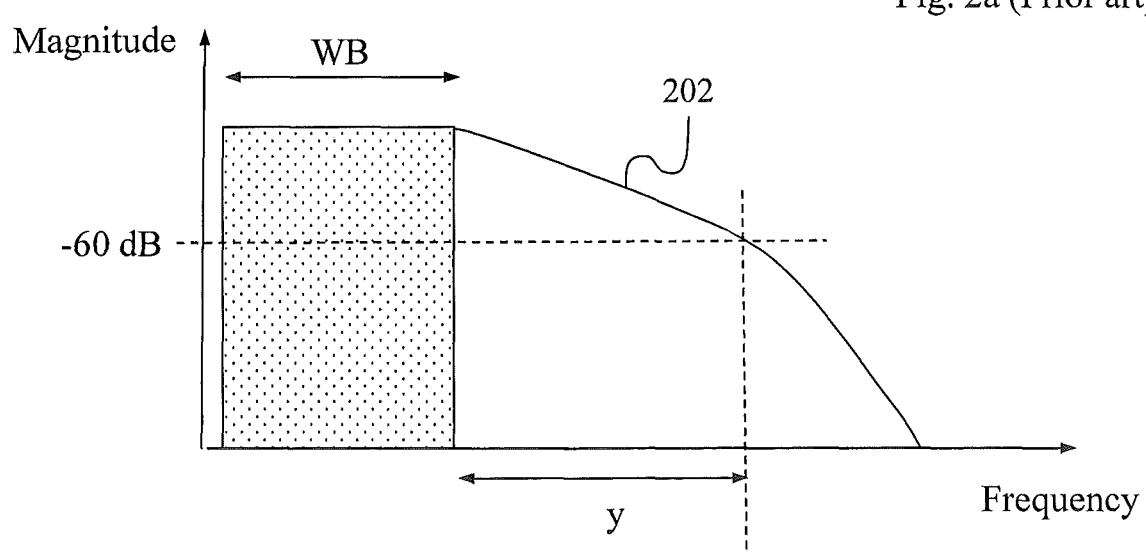

It is therefore suggested that the user node applies a mode switching scheme comprising first intervals for the multi-carrier mode and second intervals for the single carrier mode, and that it uses a second filter configuration during the second intervals to receive a single carrier for the downlink communication. The second filter configuration can be significantly more narrow than the first filter configuration, for example as illustrated in FIGS. 1 and 2a-b, which means that the receiver can be considered more or less protected from the interference when using the second filter configuration during the second intervals.

Thereby, the user node is enabled to receive messages and/or control signaling from the network node more safely, i.e. by being less sensitive to harmful interference, over the single frequency carrier during the second intervals, which may be important or even crucial for maintaining the connection. The single carrier mode may e.g. be used for receiving a paging message for an incoming call or for receiving important instructions from the network node needed to improve the ability of correct detection and decoding of received signals in the user node, or to order the user node to reduce its transmit power if too high. The length of the second intervals may be relatively short and just a fraction of the length of the first intervals in order to make the reduction of throughput during the single carrier mode as small as possible still making room for any needed messages and signaling.

Figure 3:
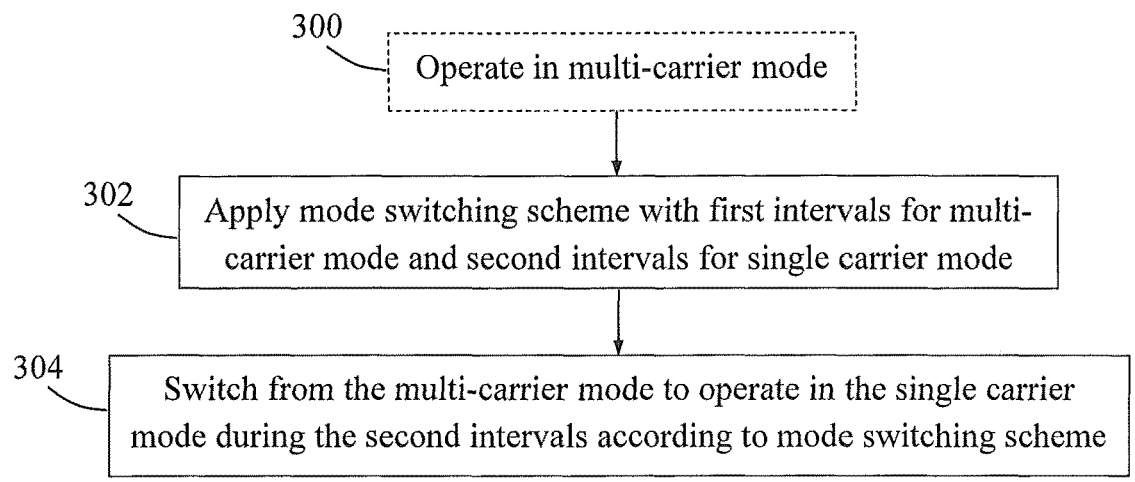
FIG. 3 is a flow chart illustrating a procedure that may be performed by a user node, according to some possible embodiments.

An example of how the user node may operate to accomplish the above solution and benefits will now be described with reference to the flow chart in FIG. 3, comprising actions performed by the user node for maintaining a connection with a network node of a wireless communications network. It is assumed that the user node operates in a multi-carrier mode using a first filter configuration to receive multiple frequency carriers simultaneously for downlink communication. The first filter configuration may have similar characteristics as described above for FIG. 2b, that is a relatively wide nominal bandwidth. The number of carriers to use in the multi-carrier mode is optional, i.e. at least two or more, and while two or four carriers are often used in practice for multi-carrier mode the solution is not limited in this respect.

A first action 300 illustrates that the user node may initially operate solely in the multi-carrier mode, thus using the first filter configuration for receiving signals from the network node on the multiple carriers. In a next action 302, the user node applies a mode switching scheme for switching between the multi-carrier mode and a single carrier mode at regular intervals determined by the mode switching scheme. In the single carrier mode, the user node uses a second filter configuration to receive a single carrier for the downlink communication. In this action, the user node also notifies the network node, by sending a suitable message or indication, that it should transmit in the multi-carrier mode during the first intervals and possibly transmit any message or control signaling in the single carrier mode to the user node, if needed, during the second intervals accordingly the mode switching scheme.

The second filter configuration may have similar characteristics as described above for FIG. 2a. Thus, the second filter configuration involves a relatively narrow filter bandwidth while the first filter configuration involves a relatively wide filter bandwidth more sensitive to interference, e.g. as illustrated in FIGS. 2a and 2b, respectively. The mode switching scheme applied in action 302 comprises first intervals for the multi-carrier mode which may be used for conveying data, and second intervals for the single carrier mode, the latter effectively providing a "fallback" for the ongoing communication to get across useful control messages or signaling to the user node in case the multi-carrier mode is subjected to harmful interference. The second intervals may also be referred to as "single carrier fallback intervals".

The mode switching scheme may be applied only when a monitored level of downlink interference exceeds a certain "first" threshold, which will be described in more detail later below. The user node may at some point later stop applying the mode switching scheme and operate solely in the multi-carrier mode when the interference level falls below another "second" threshold, assuming that the user node is able to properly receive and decode messages and signaling in the multi-carrier mode at such low interference level. In order to avoid too frequent changes between applying the mode switching scheme and not in a "ping-pong" manner, the second threshold should be lower than the first threshold by a certain margin which may be configurable for optimal operation. In this context, "harmful interference" implies that the interference impacts performance of the communication negatively in some respect. For example, harmful interference may potentially make the user node unable to detect transmission on the DL, and/or to decode/demodulate a block on the downlink, etc.

The mode switching scheme may have been defined such that the second intervals are considerably shorter than the first intervals in order to minimize the reduction of throughput during the second intervals of data that can be conveyed over the single carrier as compared to the throughput during the second intervals over the multiple carriers. However, the second intervals may have been defined to have sufficient length and rate, i.e. occurrence, to ensure that the network node can get across any needed messages or control signaling to the user node in time during the second intervals even at severe conditions when virtually no communication can be conveyed properly during the multi-carrier mode, e.g. due to high interference.

In a possible embodiment, the mode switching scheme may even have been defined such that the first intervals have a length of zero in case of particularly harsh conditions when the multi-carrier mode cannot be used at all, i.e. the user node will then only use the single carrier mode for reception at all times since the multi-carrier mode is useless anyway while the single carrier mode still works. In general, the length and/or rate of the first and second intervals may be dependent on the amount of interference such that different mode switching schemes may be selected at different levels of interference.

A further action 304 illustrates that the user node switches temporarily from the multi-carrier mode to operate in the single carrier mode during the second intervals according to the applied mode switching scheme. Thereby, the user node is effectively enabled to maintain the connection by receiving messages and/or control signaling from the network node over the single frequency carrier during the second intervals. It should be noted that the single frequency carrier of the second intervals may be used for conveying data as well and the solution is not limited to any particular transmissions during the second intervals.

In various possible embodiments, the mode switching scheme may be obtained by e.g. system information broadcasted from the network node, or by dedicated signaling to the user node from the network node, or by pre-configuration of the user node. The user node may use one or more of the above mechanisms for obtaining the mode switching scheme. Furthermore, the mode switching scheme may be obtained by obtaining at least one of: a parameter indicating the single frequency carrier, a parameter indicating periodicity of the second intervals, a parameter indicating start time of the second intervals, a parameter indicating length of the second intervals, and a reference to a predefined pattern of the first and second intervals.

The first filter configuration may have been selected with a smallest possible nominal bandwidth that covers the multiple frequency carriers in the multi-carrier mode. In other words, the filter should not extend beyond a range from the lowest frequency to the highest frequency used in the multi-carrier mode.

Figure 4:
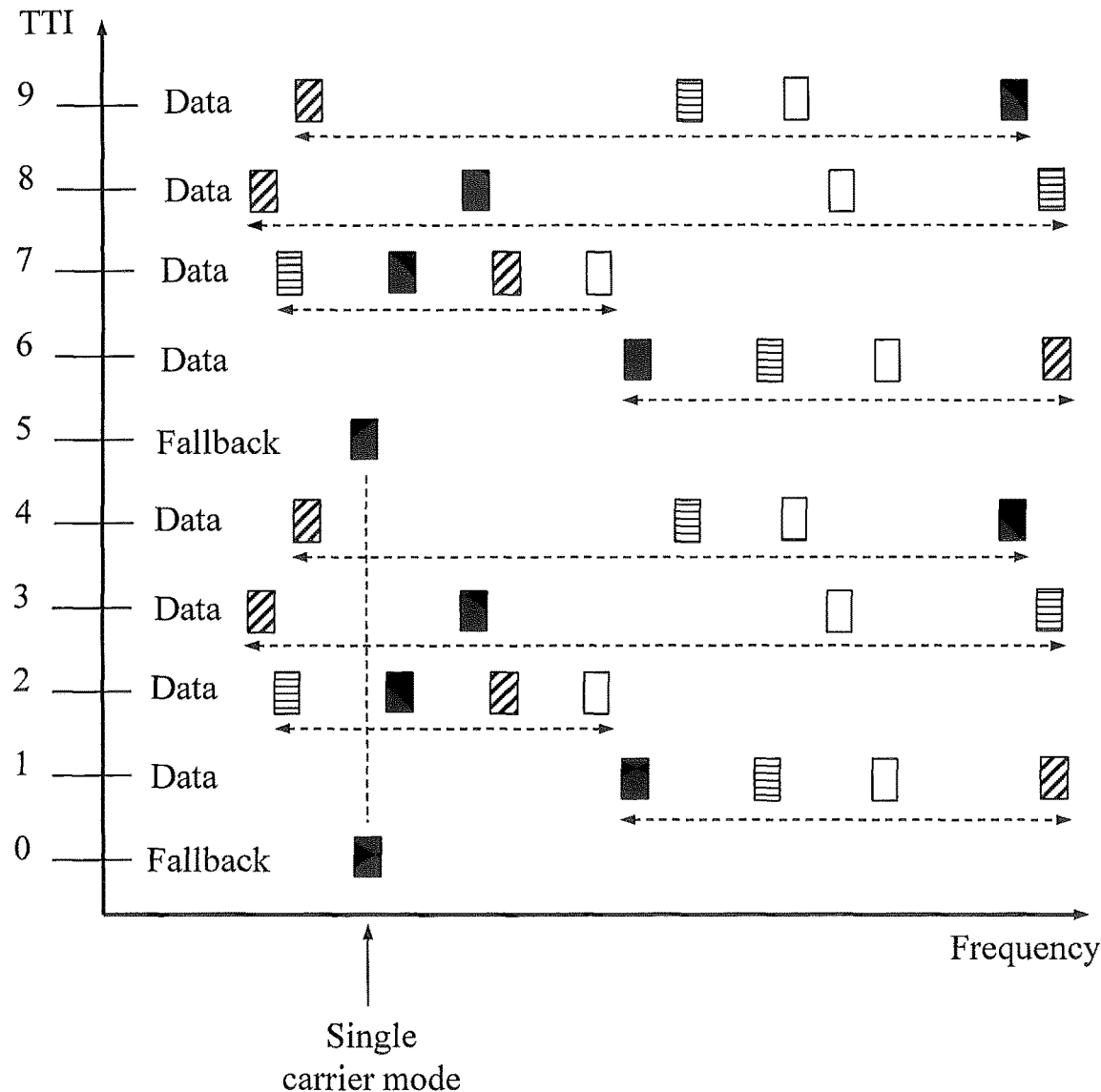
FIG. 4 is a diagram illustrating an example of how a mode switching scheme may be configured for a user node, according to further possible embodiments.

A practical example of how the above-described mode switching scheme may be defined is illustrated by the frequency—time diagram in FIG. 4 where carriers used in the multi-carrier mode and in the single carrier mode, respectively, are depicted at different time intervals, or "Transmission Time Intervals", TTIs, 0-9. In this example, the multi-carrier mode involves four parallel carriers illustrated schematically as respective black, white and two different striped areas, while the single carrier mode involves a single carrier illustrated as a black area in the figure. The mode switching scheme is regular in that the single carrier mode with a single black-illustrated carrier, marked as "fallback", occurs every fifth TTI in this example, that is at TTIs 0 and 5 within the shown time period TTI 0-9, while the multi-carrier mode with four differently illustrated carriers, marked as "data", occurs at the remaining TTIs, that is at TTIs 1-4 and 6-9 within the shown time period. Thus, the first and second intervals discussed above occur at TTIs 1-4, 6-9 and at TTIs 0, 5, respectively. However, the solution is not limited to any particular occurrences of the first and second intervals which may thus occur at any suitable TTIs or similar time periods, and the solution is not limited in this respect. The user node will thus use the first filter configuration with a wide filter during the first intervals, the filter bandwidth being indicated by respective dashed two-way arrows in the figure, and the second filter configuration during the second intervals.

It should be noted that the shown time span of TTIs 0-9 can be repeated e.g. as long as the communication is ongoing, or until the interference is deemed harmless such that the mode switching scheme is no longer necessary and the multi-carrier mode alone can safely be used. Further, it is illustrated in the example of FIG. 4 that frequency hopping is applied where the actual frequency of each carrier changes at different TTIs in the multi-carrier mode according to one or more frequency hopping schemes, which is well-known as such in this field. Even though the frequencies of the four carriers thus change, or hop, at different TTIs during the first intervals, the same frequency is used for the single carrier during the second intervals in this example. As a result, the first filter configuration needs to have a varying bandwidth during the first intervals, which is illustrated by different widths of the dashed two-way arrows.

Furthermore, it was mentioned above that the first filter configuration might be selected with a "smallest possible" nominal bandwidth that covers the multiple frequency carriers in the multi-carrier mode such that the filter does not extend beyond a range from the lowest frequency to the highest frequency used in the multi-carrier mode. In the example of FIG. 4, the smallest possible nominal bandwidth of the first filter configuration is indicated by the dashed two-way arrows for the different TTIs 1-4, 6-9 where the multi-carrier mode is employed. For simplicity, a single frequency separation per TTI is shown in this figure. It should however be understood that the radio block transmitted during a TTI may hop on up to four different frequencies in each TDMA frame, resulting in four different frequency spans from the lowest frequency to the highest frequency used.

It is further possible to apply frequency hopping for the single carrier during the second intervals as well, not shown, such that the single carrier comes at different frequencies at different occurrences of the second intervals according to another frequency hopping scheme. In that case, the second filter configuration needs to change its receiving frequency accordingly. However, the embodiments described herein may be used regardless of whether frequency hopping is applied or not.

Figures 5, 6A:
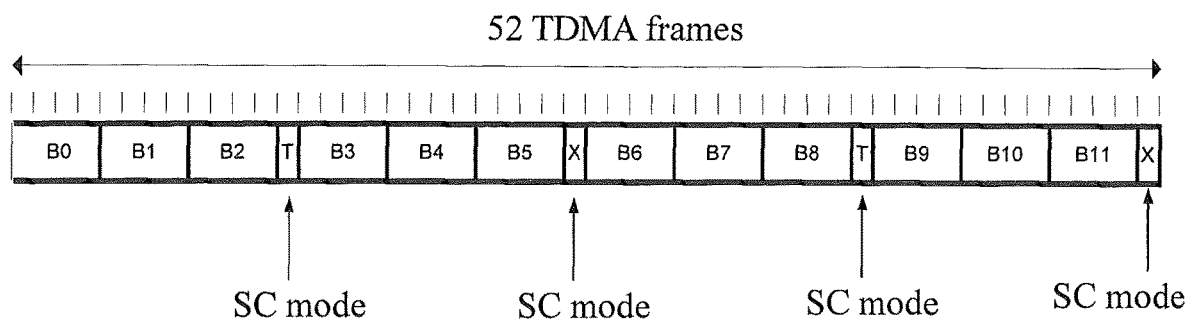
FIG. 5 is a diagram illustrating an example of how a mode switching scheme may be configured for a user node within a Time Division Multiple Access (TDMA) frame structure, according to further possible embodiments.
FIGS. 6a and b are diagrams illustrating an example of how mode switching schemes may be configured when the solution is used for several different user nodes, according to further possible embodiments.

The diagram in FIG. 5 illustrates an example of how a mode switching scheme may be configured for a user node within a Time Division Multiple Access, TDMA, frame structure where a "multiframe" for downlink transmissions is comprised of 52 TDMA frames. According to GSM for example, such a multiframe may be divided into 12 blocks B0-B11 of four TDMA frames each for communicating data and control information, two idle TDMA frames denoted "X" and two further TDMA frames denoted "T" which are assigned for a Packet Timing advance Control Channel, PTCCH, used for transmitting timing advance information on the downlink when needed. In this example, the second intervals of the single carrier mode, indicated as "SC mode", are allocated on the two X-frames and on the two T-frames in this multiframe structure, such that the network node can get across messages and/or control signaling to the user node over the single frequency carrier during these TDMA frames T and X.

In the above multiframe structure, the 12 blocks B0-B11 can be used for conveying data and control signaling from a network node to various user nodes. For example in GSM or Enhanced Data Rates for GSM Evolution, EDGE, the transmission of an information block carrying either dedicated control signaling on the Packet Associated Control Channel, PACCH, or packet data on the Packet Data Traffic Channel, PDTCH, constitutes four normal bursts which can be transmitted in four consecutive TMDA frames, thus defining a radio block according to common terminology. A radio block is transmitted during a TTI. The second intervals that can be used for fallback in the single carrier mode according to the mode switching scheme may be defined in terms of both frequency, i.e. which carrier to use for the fallback, and time allocation, i.e. which timeslot or TTI to monitor on that carrier for downlink signaling or messages.

Some non-limiting examples of how a regularly occurring interval for the single carrier mode, i.e. the above-described second intervals, can be defined are presented below. The second intervals used for the fallback may be defined by means of a parameter "SC_FALLBACK_INTRV" which denotes a multiframe periodicity indicating how often the second intervals occur. One or more of the below parameters may also be used to specify occurrence of the second intervals. A starting single carrier block of the second intervals may be denoted "STRT_BLK" indicating where in the 52 multiframe structure the second intervals are allocated for this particular user node. Further, a number of consecutive single carrier blocks may be denoted "NR_SC_BLKS" which may be used as the above-mentioned parameter indicating length of the second intervals. Still further, the multiframe number where single carrier fallback occurs may be denoted "SC_MFRM" which may also be used to define the second intervals.

It should be noted that the above parameters are only non-limiting examples of possible implementation options for how the mode switching scheme can be realized. For example, it may be desirable that the use of the single carrier mode should reduce throughput as little as possible. To ensure adequate performance of the single carrier mode, it may be possible for the network to dynamically configure the fallback second intervals per user node. Thus, the mode switching scheme may be configured dynamically by the network for a specific user node depending on the capabilities and current conditions of that user node.

The mode switching scheme, e.g. as defined by the parameters above, may be conveyed to the user node in system information broadcasted from the network node by using a newly defined Information Element "IE" or by re-using an existing IE such as, e.g., the existing parameter called "BS_PA_MFRMS" which is normally used to indicate the number of 51-multiframe intervals between successive transmissions of paging messages to user nodes within a paging group. Below are some examples of how the SC_FALLBACK_INTRV can be signaled from the network. Since the mode switching scheme could be the same for all user nodes utilizing a multi-carrier mode, it would be sufficient to signal a single value in broadcasted system information to indicate the mode switching scheme. The mode switching scheme may alternatively be conveyed to the user node by dedicated signaling to that user node, e.g. over the channel PACCH.

Assuming several user nodes are allocated to the same physical resource, such as the channel called "Packet Data Channel", PDCH, it may be necessary to "spread out" the single carrier fallback pattern to minimize the delay of control signaling to each user node, e.g. in case the above-described blocking scenario would occur. The starting block STRT_BLK within a 52-multiframe should thus also be signaled to the user nodes together with the number of consecutive blocks NR_SC_BLKS to be received within the 52-multiframe. As an example, the above parameters STRT_BLK, NR_SC_BLKS and SC_MFRM may be determined as:

STRT_BLK=[0,11]
NR_SC_BLKS=min([0,11],12-STRT_BLK)
SC_MFRM=[0, SC_FALLBACK_INTRV-1]

To determine the multiframe where the single carrier fallback occurs, as specified by SC_MFRM, the following equation should be fulfilled:

SC_MFRM=(FN div 52) mod (SC_FALLBACK_INTRV)

where "FN" denotes a TDMA frame number, "mod" denotes a Modulo operator and "div" denotes Integer division. It should be noted that it may be possible that not all but a subset of the above parameters (SC_FALLBACK_INTRV, SC_MFRM, STRT_BLK, NR_SC_BLKS) are specified while still achieving an unambiguous mapping of user nodes to blocks used for the single carrier mode of a mode switching scheme.

The diagram in FIG. 6a illustrates an example of how the single carrier fallback of a mode switching scheme, i.e. the above-described second intervals, may be applied with different parameter settings for twelve user nodes 1-12 within the two muliframes denoted 0 and 1, thus being values of the parameter SC_MFRM. In this example, the second intervals for user nodes 1-6 are allocated in the SC_MFRM of 0, while the second intervals for user nodes 7-12 are allocated in the SC_MFRM of 1. Further, the STRT_BLK of user nodes 1-6 are 0, 1, 2, 4, 5 and 6, respectively, within the SC_MFRM of 0, while the STRT_BLK of user nodes 7-12 are 0-5 and 9, respectively, within the SC_MFRM of 1. Further, the NR_SC_BLKS is either 1 or 2 for the user nodes 1-12 as indicated in the diagram.

Figure 6B:
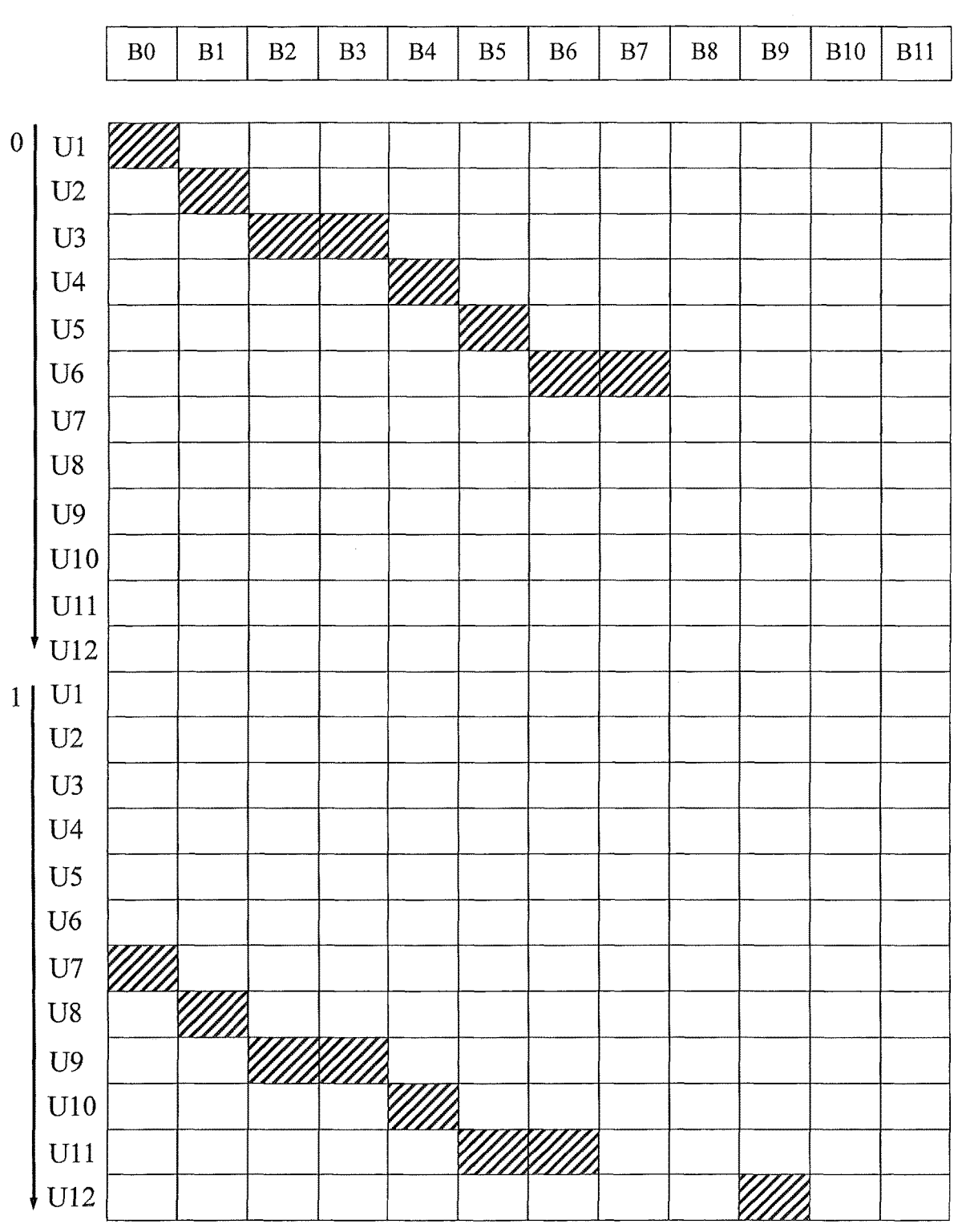

This distribution of the second intervals for the user nodes 1-12 is also shown in the diagram of FIG. 6b where the user nodes 1-12, i.e. their second intervals, are allocated across the 12 blocks B0-B11 as follows. In the SC_MFRM of 0 indicated by a first vertical arrow, and in accordance with FIG. 6a, the first user node U1 is allocated to block B0, the second user node U2 is allocated to block B1, the third user node U3 is allocated to blocks B2 and B3, the fourth user node U4 is allocated to block B4, the fifth user node U5 is allocated to block B5, and the sixth user node U6 is allocated to blocks B6 and B7. The remaining blocks B8-B11 are not used for the second interval in the SC_MFRM of 0.

In the SC_MFRM of 1 indicated by a second vertical arrow, the next user node U7 is allocated to block B0, the next user node U8 is allocated to block B1, the next user node U9 is allocated to blocks B2 and B3, the next user node U10 is allocated to block B4, the next user node U11 is allocated to block B5, and the final user node U12 is allocated to block B9. The remaining blocks B7, B8, B10 and B11 are not used for the second interval in the SC_MFRM of 1. These patterns may then be repeated in successive multiframes and/or modified e.g. when any of the user nodes 1-12 are deactivated or when new user nodes are activated in the network.

As said above, FIGS. 6a and 6b illustrate just an example of how the second intervals of a mode switching scheme might be allocated to 12 different user nodes and it can be readily understood that there are many possibilities of how different user nodes can be distributed across blocks or other radio resources, e.g. depending on current load and traffic in the network. It is an advantage that this solution thus allows for great flexibility such that an efficient allocation of the second intervals may be achieved in terms of resource usage.

Figure 7:
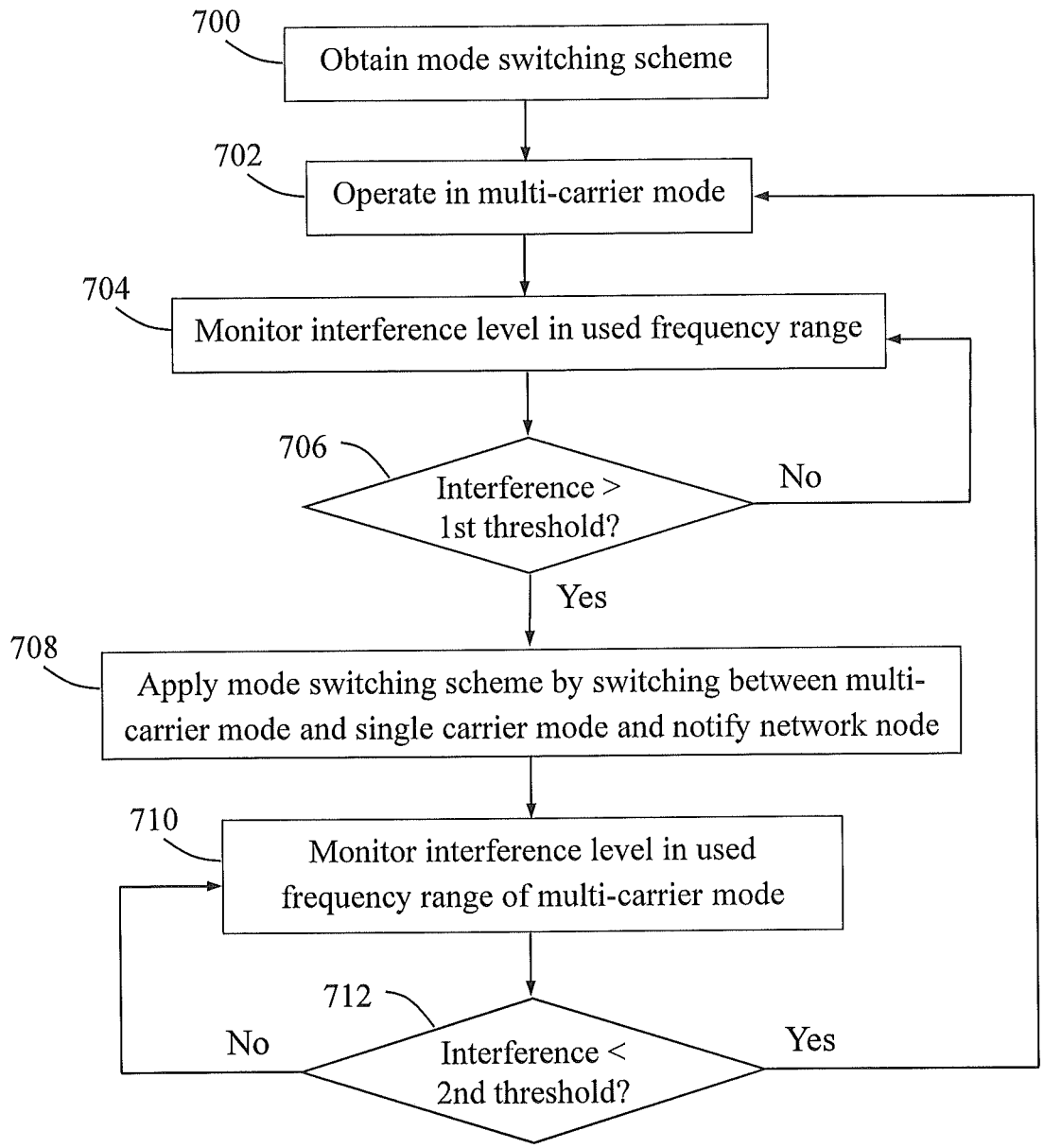
FIG. 7 is a flow chart illustrating a more detailed procedure that may be performed by a user node, according to further possible embodiments.

An example of a procedure that could be performed by a user node when this solution is applied according to some possible embodiments, will now be described with reference to the flow chart of FIG. 7. It is assumed that the user node is connected to a network node of a wireless communications network such as a base station or the like. In a first shown action 700, the user node somehow obtains a mode switching scheme, e.g. by any of: system information broadcasted from the network node, dedicated signaling from the network node, and pre-configuration of the user node. A following action 702 illustrates that the user node operates in a multi-carrier mode using a first filter configuration to receive multiple frequency carriers simultaneously for downlink communication, e.g. when receiving data from the network node. Actions 700 and 702 are not necessarily executed in this order and may be executed inversely or basically at the same time.

In another action 704, the user node monitors the amount of interference, or interference level, that occurs within the frequency range of the multi-carrier mode that is the frequency range that the user node receives by means of the first filter configuration. This action is executed basically in conjunction with action 702. The user node then determines whether the interference level is above a first threshold, in another action 706. If not, the user node continues to operate in the multi-carrier mode using the first filter configuration by returning to action 702. The first threshold may have been set so that the current interference level, being below the first threshold, can be assumed to be harmless for the communication in the multi-carrier mode and it is therefore not necessary to apply a fallback to the single carrier mode to ensure safe communication of downlink messages or control signaling to the user node.

On the other hand, if the interference level is above the first threshold in action 706, the user node applies the obtained mode switching scheme and switches between the multi-carrier mode and the single carrier mode according to the mode switching scheme, in an action 708, wherein a second filter configuration is used to receive a single carrier for the downlink communication. The mode switching scheme thus comprises first intervals for the multi-carrier mode and second intervals for the single carrier mode. As mentioned above, the length of the second intervals may be considerably shorter than the length of the first intervals, still allowing messages and signaling to get across in time to the user node in order to maintain the connection. Applying the obtained mode switching scheme in action 708 also includes notifying the network node that the mode switching scheme is being applied by the user node and that the network node can also apply the mode switching scheme and accordingly transmit in the multi-carrier mode during the first intervals and transmit in the single carrier mode during the second intervals.

In another action 710, the user node continues to monitor the amount of interference, or interference level, that occurs within the frequency range of the multi-carrier mode when using the first filter configuration while applying the mode switching scheme of action 708. Action 710 is thus executed basically in conjunction with action 708. The user node then determines whether the interference level has fallen below a second threshold, in another action 712. If not, the user node continues to switch between the multi-carrier mode and the single carrier mode according to the mode switching scheme as of action 710. On the other hand, if the interference level is below the second threshold in action 712, the user node can safely disable the mode switching scheme and operate instead only in the multi-carrier mode by returning to action 702.

The second threshold may have been set to be lower than the first threshold by a certain margin to avoid too frequent changes between applying the mode switching scheme and not, that is in a ping-pong manner. As mentioned above, the margin may be configurable for optimal operation. However, it is also possible that the second threshold is more or less equal to the first threshold. Further, in actions 706 and 712 of evaluating the monitored interference level against the first and second thresholds, respectively, the conditions therein may need to be fulfilled for a certain time before determining that the respective conditions are satisfied.

Figure 8:
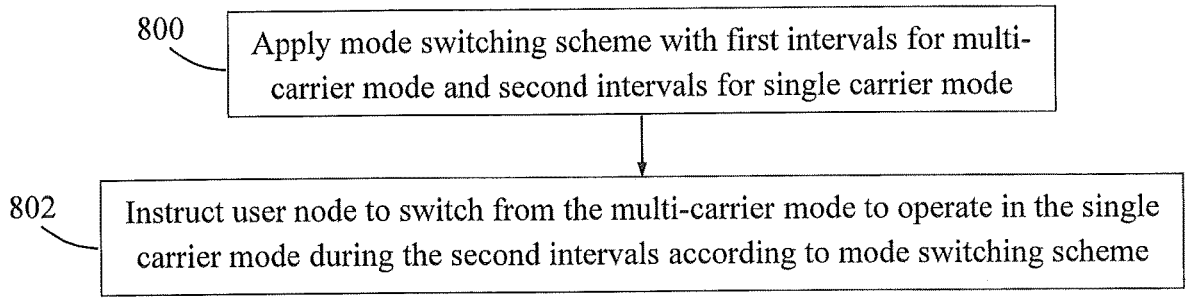
FIG. 8 is a flow chart illustrating a procedure that may be performed by a network node, according to further possible embodiments.

In the above examples, the user node has been described as being responsible for applying the mode switching scheme or not. However, it is also possible that the network node decides whether the mode switching scheme should be applied for the user node or not. An example of how a network node of a wireless communications network may operate in that case to accomplish the above solution and benefits, will now be described with reference to the flow chart in FIG. 8. This flow chart illustrates actions performed by the network node for maintaining a connection with a user node when operating in a multi-carrier mode of sending multiple frequency carriers simultaneously for downlink communication with the user node. It is thus assumed that the user node initially operates in the multi-carrier mode using a first filter configuration to receive the multiple frequency carriers simultaneously, e.g. as described for action 300 in FIG. 3.

A first action 800 illustrates that the network node applies a mode switching scheme comprising first intervals for the multi-carrier mode and second intervals for a single carrier mode of sending a single carrier for the downlink communication. In a next action 802, the network node instructs the user node to switch temporarily from the multi-carrier mode to operate in the single carrier mode during the second intervals according to the mode switching scheme. Thereby, the user node is enabled to maintain the connection by receiving messages and/or control signalling from the network node over the single frequency carrier during the second intervals, e.g. as described for actions 302 and 304 in FIG. 3.

Figure 9:
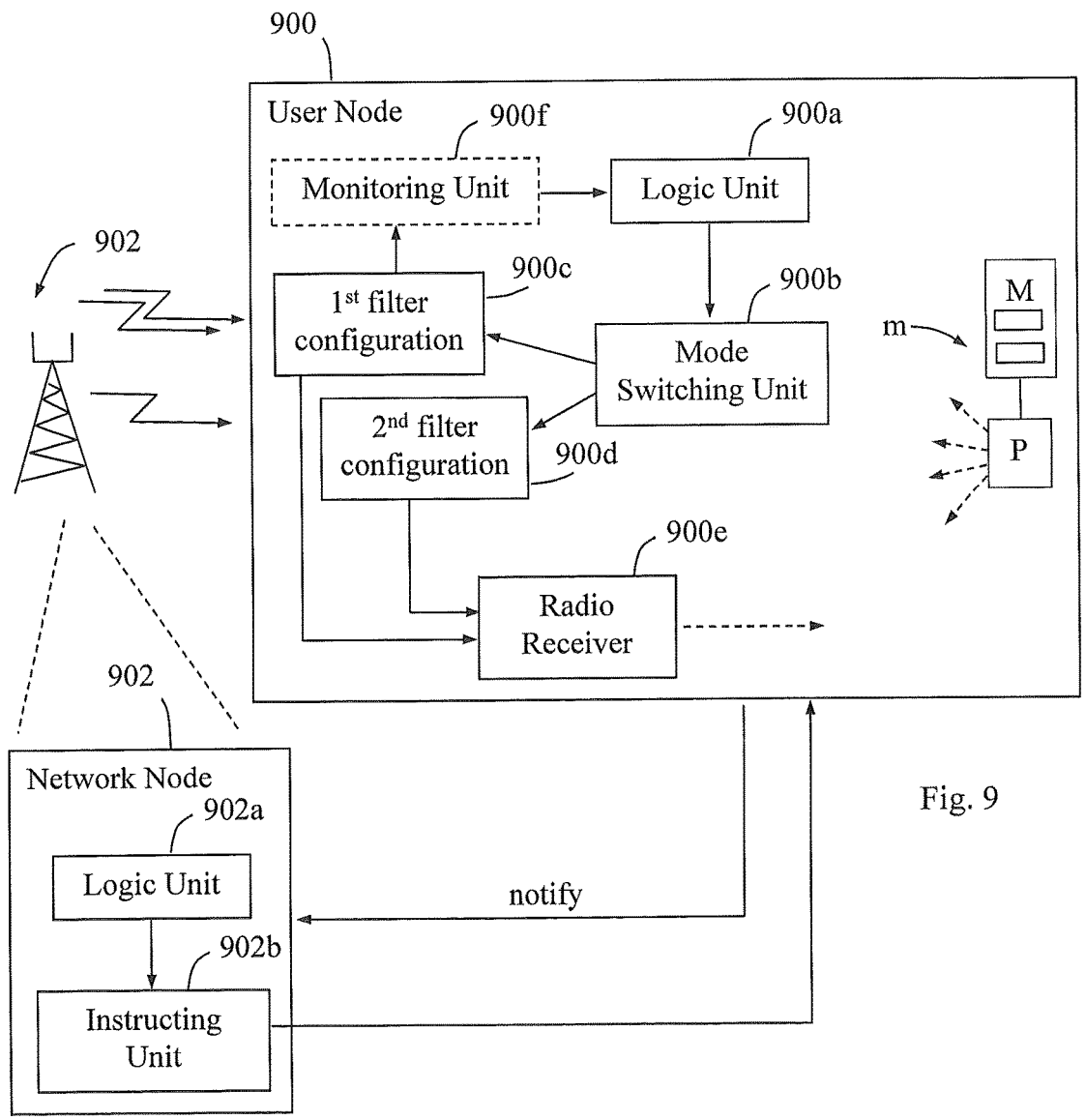
FIG. 9 is a block diagram illustrating a user node and a network node in more detail, according to further possible embodiments.

A detailed but non-limiting example of how a user node and a network node may be structured with some possible functional units to bring about any of the above-described procedures and features, is illustrated by the block diagram in FIG. 9. In this figure, a user node 900 is configured to maintain a connection with a network node 902 of a wireless communications network when operating in a multi-carrier mode using a first filter configuration 900c to receive multiple frequency carriers simultaneously for downlink communication. The user node 900 may be configured to operate according to any of the examples described above.

The user node 900 comprises a logic unit 900a adapted to apply a mode switching scheme comprising first intervals for the multi-carrier mode and second intervals for a single carrier mode using a second filter configuration 900d to receive a single carrier for the downlink communication. The user node 900 also comprises a mode switching unit 900b adapted to switch temporarily from the multi-carrier mode to operate in the single carrier mode during the second intervals according to the mode switching scheme, thereby enabling the user node 900 to maintain the connection with the network node 902 by receiving messages and/or control signalling from the network node 902 over the single frequency carrier during the second intervals.

In practice, the filter configurations 900c and 900d are coupled to a receiving antenna, not shown. Either of the filter configurations 900c and 900d may further be connected to a radio receiver 900e such that the latter receives signals that have been filtered by filter configuration 900c or by filter configuration 900d as controlled by the mode switching unit 900b. Further, a monitoring unit 900f may be employed for monitoring the level of interference when the user node 900 operates in the multi-carrier mode using the first filter configuration 900c for receiving downlink signals, in accordance with certain embodiments below.

The user node 900 may also be configured to notify or instruct the network node 902, as shown by an arrow "notify", that the mode switching scheme is applied by the user node 900. This means that the network node 902 should transmit in the multi-carrier mode during the first intervals and that it is able to transmit any message or control signaling in the single carrier mode to the user node 900, if needed, during the second intervals accordingly the mode switching scheme. It should be noted that the network node 902 does not have to transmit something to the user node 900 every time the second intervals occur, but it has the possibility to do so whenever needed.

It should be noted that FIG. 9 illustrates various functional units in the user node 900 and the network node 902, and the skilled person is able to implement these functional units in practice using suitable software and hardware. Thus, the solution is generally not limited to the shown structures of the user node 900 and the network node 902, and the functional units 900a-b and 902a-b may be configured to operate according to any of the features described in this disclosure, where appropriate.

The functional units 900a-b described above may be implemented in the user node 900 by means of program modules of a respective computer program comprising code means which, when run by a processor "P" in the user node 900 causes the user node 900 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the user node 900 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the user node 900.

The above user node 900 and its functional units 900a-b may be configured or adapted to operate according to various optional embodiments. In a possible embodiment, the logic unit 900a may be adapted to apply the mode switching scheme when detecting that a monitored interference level in a frequency range of the multi-carrier mode exceeds a first threshold, e.g. as described above for actions 704-708. In another possible embodiment, the logic unit 900a may be adapted to disable the mode switching scheme and use only the multi-carrier mode when detecting that the interference level in the frequency range of the multi-carrier mode is below a second threshold. A potential advantage of these embodiments is that the mode switching scheme will be employed only when warranted by the level of interference.

According to further possible embodiments, the logic unit 900a may be adapted to obtain the mode switching scheme by at least one of: system information broadcasted from the network node, dedicated signaling from the network node, and pre-configuration of the user node. In either case, the logic unit 900a may be adapted to obtain the mode switching scheme by obtaining at least one of: a parameter indicating the single frequency carrier, a parameter indicating periodicity of the second intervals, a parameter indicating start time of the second intervals, a parameter indicating length of the second intervals, and a reference to a predefined pattern of the first and second intervals.

In another possible embodiment, the user node 900 may be configured to receive the mode switching scheme in system information from the network node using a newly defined Information Element or re-using an existing Information Element. Some non-limiting examples of how the Information Element may be implemented in practice have been described above.

In another possible embodiment, the user node 900 may be configured to apply frequency hopping for the single frequency carrier during the second intervals, which embodiment has the potential advantage of not being dependent on a single frequency that may be greatly interfered or otherwise impeded. Further, the logic unit 900a may be adapted to select the mode switching scheme from a set of predefined mode switching schemes depending on a monitored interference level in a frequency range of the multi-carrier mode. Potential advantages of these embodiments include that a very short reference or identity can be used for identifying the selected mode switching scheme, and that it is possible to select the "best" mode switching scheme for the prevailing interference conditions.

The user node 900 may also be configured to select the first filter configuration with a smallest possible nominal bandwidth that covers the multiple frequency carriers in the multi-carrier mode. A potential advantage of this embodiment is that the filter configuration may be made as little susceptible to interference as possible, which can be understood from the discussion above of FIGS. 2a and 2b.

FIG. 9 also illustrates functional units in the network node 902 which may operate as follows if it is the network node 902 that takes the initiative to apply the mode switching scheme. Thus in this figure, the network node 902 may be configured to maintain the connection with the user node 900 when operating in a multi-carrier mode of sending multiple frequency carriers simultaneously for downlink communication.

The network node 902 comprises a logic unit 902a adapted to apply a mode switching scheme comprising first intervals for the multi-carrier mode and second intervals for a single carrier mode of sending a single carrier for the downlink communication. The network node 902 also comprises an instructing unit 902b adapted to instruct the user node 900 to switch temporarily from the multi-carrier mode to operate in the single carrier mode during the second intervals according to the mode switching scheme. Thereby, the user node 900 is enabled to maintain the connection by receiving messages and/or control signaling from the network node 902 over the single frequency carrier during the second intervals.

While the solution has been described with reference to specific exemplary embodiments, the description is generally only intended to illustrate the inventive concept and should not be taken as limiting the scope of the solution. For example, the terms "user node", "network node", "mode switching scheme", and "filter configuration" have been used throughout this description, although any other corresponding entities, functions, and/or parameters could also be used having the features and characteristics described here. The solution is defined by the appended claims.

The invention claimed is:

1. A method performed by a user node for maintaining a connection with a network node of a wireless communications network when operating in a multi-carrier mode using a first filter configuration to receive multiple frequency carriers simultaneously for downlink communication, the method comprising:
   obtaining a reference to a predefined repeating pattern of first time intervals for the multi-carrier mode using the first filter configuration and second time intervals for a single carrier mode using a second filter configuration to receive a single carrier for the downlink communication;
   selecting a predetermined mode switching scheme from a set of predefined mode switching schemes based on the obtained reference and a monitored interference level in a frequency range of the multi-carrier mode, wherein each predefined mode switching scheme of the set of predefined mode switching schemes comprise a different set of first time intervals for the multi-carrier mode and second intervals for the single carrier mode associated with a different level of interference in the frequency range of the multi-carrier mode;
   applying the selected predetermined mode switching scheme,
   switching temporarily from operating the user node in the multi-carrier mode in which the user node simultaneously receives downlink communications from the network node over multiple carriers to operating in the single carrier mode during the second time intervals in which the user node receives downlink communications from the network node over only the single carrier according to the selected predetermined mode switching scheme; and
   receiving control signalling from the network node over the single frequency carrier during the second time intervals so that the user node maintains the connection with the network node.

2. A method according to claim 1, wherein selecting the predetermined mode switching scheme comprises detecting that a monitored interference level in a frequency range of the multi-carrier mode exceeds a first threshold.

3. A method according to claim 2, further comprising disabling the predetermined mode switching scheme and operating the user node only in the multi-carrier mode responsive to detecting that the monitored interference level in the frequency range of the multi-carrier mode is below a second threshold.

4. A method according to claim 1, wherein obtaining the reference comprises obtaining the reference from at least one of: system information broadcasted from the network node, dedicated signalling from the network node, and a pre-configuration of the user node.

5. A method according to claim 1, wherein obtaining the reference comprises obtaining at least one of a parameter indicating start time of the second time intervals and a parameter indicating length of the second time intervals.

6. A method according to claim 4, wherein the system information broadcasted from the network node comprises system information broadcasted in an Information Element (IE).

7. A method according to claim 1, wherein the first filter configuration is selected to produce a bandwidth that extends from a lowest frequency to a highest frequency of the multiple frequency carriers in the multi-carrier mode; and
   wherein the second filter configuration is selected to produce a bandwidth that comprises the frequency of the single carrier in the single-carrier mode.

8. A user node configured to maintain a connection with a network node of a wireless communications network when operating in a multi-carrier mode using a first filter configuration to receive multiple frequency carriers simultaneously for downlink communication, the user node comprising:
   a processor;
   at least one memory comprising instructions when executed by the processor cause the processor to:
   obtain a reference to a predefined repeating pattern of first time intervals for the multi-carrier mode using the first filter configuration and second time intervals for a single carrier mode using a second filter configuration to receive a single carrier for the downlink communication;
   select a predetermined mode switching scheme from a set of predefined mode switching schemes based on the obtained reference and a monitored interference level in a frequency range of the multi-carrier mode, wherein each predefined mode switching scheme of the set of predefined mode switching schemes comprise a different set of first time intervals for the multi-carrier mode and second intervals for the single carrier mode associated with a different level of interference in the frequency range of the multi-carrier mode;
   apply the selected predetermined mode switching scheme; and
   switch temporarily from operating the user node in the multi-carrier mode in which the user node simultaneously receives downlink communications from the network node over multiple carriers to operating in the single carrier mode during the second time intervals in which the user node receives downlink communications from the network node over only the single carrier according to the selected predetermined mode switching scheme; and
   receive control signalling from the network node over the single frequency carrier during the second time intervals so that the user node maintains the connection with the network node.

9. A user node according to claim 8, wherein the instructions when executed by the processor further cause the processor to select the predetermined mode switching scheme by detecting that a monitored interference level in a frequency range of the multi-carrier mode exceeds a first threshold.

10. A user node according to claim 9, wherein the instructions when executed by the processor further cause the processor to disable the predetermined mode switching scheme and operate the user node in only the multi-carrier mode responsive to detecting that the monitored interference level in the frequency range of the multi-carrier mode is below a second threshold.

11. A user node according to claim 8, wherein the instructions when executed by the processor further cause the processor obtain the reference from at least one of: system information broadcasted from the network node, dedicated signalling from the network node, and a pre-configuration of the user node.

12. A user node according to claim 11, wherein the instructions when executed by the processor further cause the processor to obtain the reference by obtaining at least one of a parameter indicating start time of the second time intervals and a parameter indicating length of the second time intervals.

13. A user node according to claim 11, wherein the system information broadcasted from the network node comprises system information broadcasted in an Information Element (IE).

14. A user node according to claim 8, wherein the at least one memory comprises instructions when executed by the processor further cause the processor to:
select the first filter configuration to produce a bandwidth that extends from a lowest frequency to a highest frequency of the multiple frequency carriers in the multi-carrier mode; and
select the second filter configuration to produce a bandwidth that comprises the frequency of the single carrier in the single-carrier mode.

15. A method, performed by a network node of a wireless communications network, for maintaining a connection with a user node when operating in a multi-carrier mode of sending multiple frequency carriers simultaneously for downlink communication, the method comprising:
determining a reference to a predefined repeating pattern of first time intervals for the multi-carrier mode using the first filter configuration and second time intervals for a single carrier mode using a second filter configuration to transmit a single carrier for the downlink communication based on a monitored interference level in a frequency range of the multi-carrier mode;
transmitting the reference to the user node for the user node to select a predetermined mode switching scheme from a set of predefined mode switching schemes based on the determined reference, wherein each predefined mode switching scheme of the set of predefined mode switching schemes comprise a different set of first time intervals for the multi-carrier mode and second intervals for the single carrier mode associated with a different level of interference in the frequency range of the multi-carrier mode;
applying the predetermined mode switching scheme; and
instructing the user node to switch temporarily from operating the user node in the multi-carrier mode in which the user node simultaneously receives downlink communications from the network node over multiple carriers to operating in the single carrier mode during the second time intervals in which the user node receives downlink communications from the network node over only the single carrier according to the predetermined mode switching scheme, and
transmitting control signalling to the user node over the single frequency carrier during the second time intervals so that the user node maintains the connection with the network node.

16. A network node of a wireless communications network, configured to maintain a connection with a user node when operating in a multi-carrier mode of sending multiple frequency carriers simultaneously for downlink communication, the network node comprising:
a processor;
at least one memory comprising instructions when executed by the processor cause the processor to:
determine a reference to a predefined repeating pattern of first time intervals for the multi-carrier mode using the first filter configuration and second time intervals for a single carrier mode using a second filter configuration to transmit a single carrier for the downlink communication based on a monitored interference level in a frequency range of the multi-carrier mode;
transmit the reference to the user node for the user node to select a predetermined mode switching scheme from a set of predefined mode switching schemes based on the determined reference, wherein each predefined mode switching scheme of the set of predefined mode switching schemes comprise a different set of first time intervals for the multi-carrier mode and second intervals for the single carrier mode associated with a different level of interference in the frequency range of the multi-carrier mode;
apply the predetermined mode switching scheme; and
instruct the user node to switch temporarily from the multi-carrier mode in which the user node simultaneously receives downlink communications from the network node over multiple carriers to operating in the single carrier mode during the second time intervals in which the user node receives downlink communications from the network node over only the single carrier according to the predetermined mode switching scheme; and
transmit control signalling to the user node over the single frequency carrier during the second time intervals so that the user node maintains the connection with the network node.

17. A method according to claim 4, wherein obtaining the reference comprises obtaining a parameter indicating the single carrier.

18. A user node according to claim 11, wherein the instructions when executed by the processor further cause the processor to obtain the reference by obtaining a parameter indicating the single frequency carrier.

19. The method according to claim 15, wherein determining the reference further comprises determining the reference based on a capability and current condition of the user node.

* * * * *